(12) United States Patent
Van Den Brink

(10) Patent No.: US 8,791,904 B2
(45) Date of Patent: Jul. 29, 2014

(54) SYSTEM AND METHOD FOR MOVING A CURSOR ON A SCREEN

(75) Inventor: Hendrikus Bernardus Van Den Brink, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 183 days.

(21) Appl. No.: 13/384,370

(22) PCT Filed: Jul. 27, 2010

(86) PCT No.: PCT/IB2010/053398
§ 371 (c)(1),
(2), (4) Date: Jan. 17, 2012

(87) PCT Pub. No.: WO2011/018725
PCT Pub. Date: Feb. 17, 2011

(65) Prior Publication Data
US 2012/0119989 A1 May 17, 2012

(30) Foreign Application Priority Data
Aug. 10, 2009 (EP) .................................... 09167552

(51) Int. Cl.
*G09G 5/08* (2006.01)
(52) U.S. Cl.
USPC ........................................................ 345/157
(58) Field of Classification Search
USPC .............. 345/157–163, 167, 173; 463/37, 38; 361/679.1–679.18; 178/18.01, 178/18.03–18.07; 715/863, 864
See application file for complete search history.

(56) References Cited

U.S. PATENT DOCUMENTS

| | | | |
|---|---|---|---|
| 5,796,387 A | 8/1998 | Curran et al. | |
| 5,877,749 A * | 3/1999 | Shiga et al. | 345/168 |
| 6,297,804 B1 | 10/2001 | Kashitani | |
| 7,532,205 B2 | 5/2009 | Gillespie et al. | |
| 7,690,994 B2 * | 4/2010 | Dohta | 463/37 |
| 2004/0041789 A1 | 3/2004 | McGanty | |
| 2005/0041014 A1* | 2/2005 | Slotznick | 345/156 |

(Continued)

FOREIGN PATENT DOCUMENTS

| | | |
|---|---|---|
| FR | 2898197 A1 | 9/2007 |
| WO | 2004111826 A1 | 12/2004 |

*Primary Examiner* — Tom Sheng

(57) ABSTRACT

The invention provides a system (10) and method for moving a cursor (16) in response to pointing device movements according to a certain transfer function, wherein the transfer function is such that when the cursor (16) hits the edge of the screen (12) and the pointing device movement continues further beyond this point in a direction which cannot be followed by the cursor (16) due to reaching the edge of the screen (12), the pointing device movement is remembered and the cursor (16) starts moving away from the edge again, when the pointing device (20) is moved back by the same distance as it was moved beyond the point when the cursor (16) had hit the edge of the screen (12); or wherein the transfer function is variable according to previous pointing device movements, which were made within a previous time frame, such that small movements within the previous time frame lead to the ratio of pointing device movement to the cursor movement being greater than in the case of large movements within the previous time frame. The invention further provides a computer program for executing such a method, a data storage medium on which such a computer program is stored and a medical device comprising such a system or being adapted to execute such a method.

16 Claims, 4 Drawing Sheets

(56) References Cited

U.S. PATENT DOCUMENTS

| | | |
|---|---|---|
| 2006/0071913 A1* | 4/2006 | Wang et al. .................. 345/173 |
| 2006/0143580 A1 | 6/2006 | Gimness et al. |
| 2007/0226657 A1* | 9/2007 | Fitzmaurice et al. ......... 715/863 |
| 2008/0030463 A1 | 2/2008 | Forest |
| 2011/0134029 A1* | 6/2011 | Park et al. .................... 345/157 |

* cited by examiner

SYSTEM AND METHOD FOR MOVING A CURSOR ON A SCREEN

FIELD OF THE INVENTION

The invention relates to a system and method for moving a cursor on a screen according to a transfer function. Further, the invention relates to a computer program for executing such a method, a data storage medium on which such a computer program is stored and a medical device being such a system or being adapted to execute such a method.

BACKGROUND OF THE INVENTION

In medical intervention there is a trend towards very large screens (e.g. 56 inch) in medical exam rooms. These large screens replace current screen configurations of 17 or 19 inch screens in a 2×2 or 2×3 arrangement. There is also a desire to be able to control the applications that are displayed on the large screens from the operating table instead of just from a separate control room. On the one hand this greatly improves the freedom of displaying information for the physician while standing at an operating table. On the other hand, the handling of user interfaces by moving a pointing device (like an airmouse, gyromouse, Wii-like remote, etc.) in order to move a cursor on a very large screen might create some problems.

One possible problem might be that the user sometimes loses track of where the cursor on the screen is positioned, because it is hard to locate the cursor on the large screen.

Another handling problem might occur at the edges of the screen when the cursor hits the edge of the screen.

One way of overcoming these problems is by making the pointing device "absolute". This means that there is always a direct relation between the orientation or position of the pointing device and the position of the cursor on the screen. The advantage of this approach is that from the orientation or position of the pointing device it is always clear where the cursor on the screen is located. However, absolute devices also have some drawbacks.

With these absolute pointing devices, moving the cursor very accurately becomes difficult, because the transfer of device motion to cursor motion is fixed. This means that hand movement (shaking) is directly coupled to the cursor movement. This means also that large movements on the screen require large device (hand, arm) movements. Furthermore, this has the effect that an absolute pointing device requires maintaining a certain orientation of the pointing device without being able to change posture, which can be very tiring. For instance, it is not possible to drop the arm and continue pointing from there.

SUMMARY OF THE INVENTION

It is an object of the invention to improve the handling of moving a cursor on a screen.

This object is solved with systems and methods according to the independent claims.

According to an embodiment of the present invention there is provided a system for moving a cursor, the system comprising a pointing device for entering commands in form of a pointing device movement being the movement of the pointing device as a whole or part of it; a screen on which the cursor is displayable; a control device being connected with the pointing device and the screen, and being adapted to control the movement of the cursor within edges of the screen in response to the pointing device movement according to a certain transfer function, wherein the transfer function is such that when the cursor hits the edge of the screen and the pointing device movement continues further beyond this point in a direction which cannot be followed by the cursor due to reaching the edge of the screen, the pointing device movement is remembered and the cursor starts moving away from the edge again, when the pointing device as a whole or part of it is moved back by the same distance as it was moved beyond the time point when the cursor had hit the edge of the screen.

In a "zero-point drift" behavior in which the movement of the pointing device is such that when the cursor runs off the edge of the screen, the cursor stops at the edge of the screen, and when the movement of the pointing device is reversed, the cursor directly starts moving again, the relation between the pointing device position and position of the cursor on the screen is changed, which can be very confusing.

This embodiment mitigates this "zero-point drift". For instance, when moving the pointing device left over a large distance, the cursor hits the left edge of the screen and stays on the edge although the movement of the pointing device continues towards the left. When the pointing device is moved back towards the right to the position where the cursor stays (or moved back the same distance to the right as it was moved left from the edge), the cursor will start moving away from the edge. This implies a fixed relation between pointing device position and cursor position and improves the controllability of the cursor on the screen. This way a special edge handling is introduced in which the movement of the pointing device or part of it is remembered when the cursor hits the edge of the screen and not until moving back the pointing device by the same amount, the cursor starts moving again.

The same advantages can be achieved with a method for moving a cursor, the method comprising the steps of reading commands in form of a pointing device movement being the movement of a pointing device as a whole or part of it; displaying the cursor on a screen; controlling the movement of the cursor within edges of the screen in response to the pointing device movement according to a certain transfer function; wherein the transfer function is such that the pointing device movement is assigned to a corresponding movement of the cursor on the screen, and wherein the transfer function is such that when the cursor hits the edge of the screen and the pointing device movement continues further beyond this point in a direction which cannot be followed by the cursor due to reaching the edge of the screen, the pointing device movement is remembered and the cursor starts moving away from the edge again, when the pointing device as a whole or part of it is moved back by the same distance as it was moved beyond the time point when the cursor had hit the edge of the screen.

According to another embodiment of the invention there is provided a system for moving a cursor, the system comprising a pointing device for entering commands in form of a pointing device movement being the movement of the pointing device as a whole or part of it; a screen on which the cursor is displayable; a control device being connected with the pointing device and the screen, and being adapted to control the movement of the cursor within edges of the screen in response to the pointing device movement according to a certain transfer function; wherein the transfer function is variable according to previous pointing device movements, which were made within a previous time frame, such that small movements within the previous time frame lead to the ratio of pointing device movement to the cursor movement being greater than in the case of large movements within the previous time frame.

This embodiment has the advantage that a more accurate movement is allowed by using features that are only possible in relative pointing devices, i.e. deceleration and temporal filtering. This also allows decreasing noise in hand movement by temporal filtering, because a shaking hand only conducts small movements, these small movements will cause the ratio of pointing device movement to the cursor movement to increase such that in order to move the cursor substantially, large movements are required. This way the hand shaking is filtered out. On the other hand, when the user wants to move the cursor over a large distance, this is usually done with a large moving velocity of the pointing device, but as soon as the desired cursor position comes closer the moving velocity of the pointing device is reduced by the user. This reduction of the pointing device movement velocity causes the ratio to be changed such that larger pointing device movements are required, which makes it easier to position the cursor exactly at the desired spot.

The same advantages can be achieved with a method for moving a cursor, the method comprising the steps of reading commands in form of a pointing device movement being the movement of a pointing device as a whole or part of it; displaying the cursor on a screen; controlling the movement of the cursor within edges of the screen in response to the pointing device movement according to a certain transfer function; wherein the transfer function is variable according to previous pointing device movements, which were made within a previous time frame, such that small movements within the previous time frame lead to the ratio of pointing device movement to the cursor movement being greater than in the case of large movements within the previous time frame.

According to a further embodiment, the pointing device comprises a positioning button for positioning the cursor at a predefined position on the screen. This has the advantage that it allows different calibrations between pointing device position and cursor position by providing the positioning button that e.g. positions the cursor in the center of the large screen. In this way the pointing device can be held in any position. This allows an easy handling even with random pointing device orientations.

Advantageously it can be provided that the transfer function is variable according to the pointing device movement velocity. For example the accuracy of movements is improved by decreasing the ratio of cursor movement to pointing device movement as a function of the pointing device movement velocity. This decreases the required device movement in order to make large cursor movements on the screen (these movements are done at high speed, with a low pointing device movement to cursor movement ratio). Movements at low speed will require a larger hand movement, thus decreasing the influence of shaking.

Preferably this transfer function is such that a low pointing device velocity leads to the ratio of pointing device movement to the cursor movement being greater than in the case of a high pointing device velocity.

The above described advantages can be achieved with the following implementations of the inventions.

The invention further provides a computer program for executing one of the above mentioned methods.

Also, the invention provides a data storage medium on which such a computer program is stored.

Further, the invention provides a medical device comprising one of the above described systems or a medical device being adapted to execute one of the above described methods.

It can be seen as a gist of the invention to make the pointing device or pointing device semi-absolute with the above described transfer functions. Or in other words to modify a relative pointing device according to the above described transfer functions. The pointing device is made semi-direct by adapting the cursor's behavior when it hits the screen edge, providing a button at the pointing device for recalibrating the cursor position, and making the transfer function dependent from the pointing device movement velocity and history.

DETAILED DESCRIPTION OF EMBODIMENTS

Figure 1:
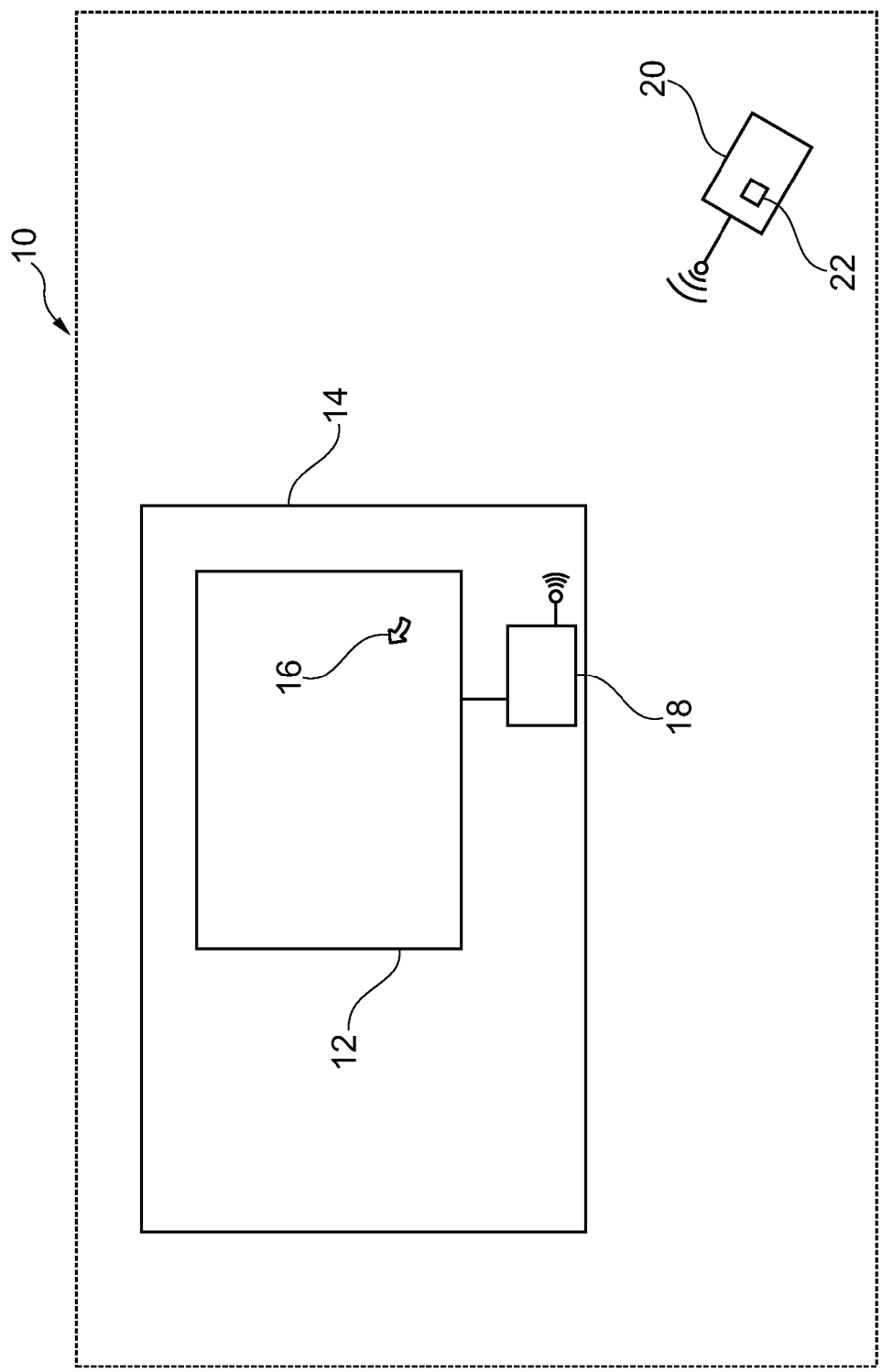
FIG. 1 shows schematically a system according to an embodiment of the invention.

FIG. 1 schematically illustrates a system 10 which is preferably a medical diagnostic apparatus, such as an X-ray tube. A screen 12 as the displaying part of a monitor is connected to a part 14 of the medical diagnostic apparatus 10 or provided as a separate part and for example attached to a wall of an operating or diagnostic room. The screen 12 is adapted to display the diagnostic results of the system 10 and/or diagnostic applications. Further, the screen 12 is adapted to display a cursor 16 for selecting different items of the application(s) which is (are) displayed on the screen. The screen 12 is controlled (or the image of the screen is provided) by a control device 18 being controllably coupled to the screen 12. Moreover, a pointing device 20 is provided for controlling the movement of the cursor 16 on the screen 12 by moving the pointing device 20, wherein "moving" includes a translation, rotation, or a combination of both. The pointing device 20 is controllably coupled with the control device 18, for example via a wireless connection (such as an optical connection or a radio connection) or an electrical line connection. As the pointing device 20 all kind of pointing devices can be used, such as a conventional computer mouse, an airmouse (which is an infrared remote control mouse used to operate a user interface by pointing the remote control at a screen and clicking on it to activate links that are displayed on the screen), a gyromouse (which is a preferably wireless pointing device that uses a very small two-dimensional gyroscope to measure the angle at which the user is holding the device with respect to two axes) or a remote which combines the use of an accelerometer and optical sensor technology to control a user interface. Instead of controlling the movement of the cursor 16 by moving the whole pointing device 20 it is also possible to provide a pointing device in which only a part of the pointing device has to be moved in order to provide movement commands for moving the cursor 16 on the screen 12. An example, for one of the latter mentioned pointing devices would be a track ball which is stationary while only a ball supported by the pointing device is moved. Thus, when mentioning in this specification the "movement of the pointing device", this should also include the movement of only a part of the pointing device.

Figure 2:
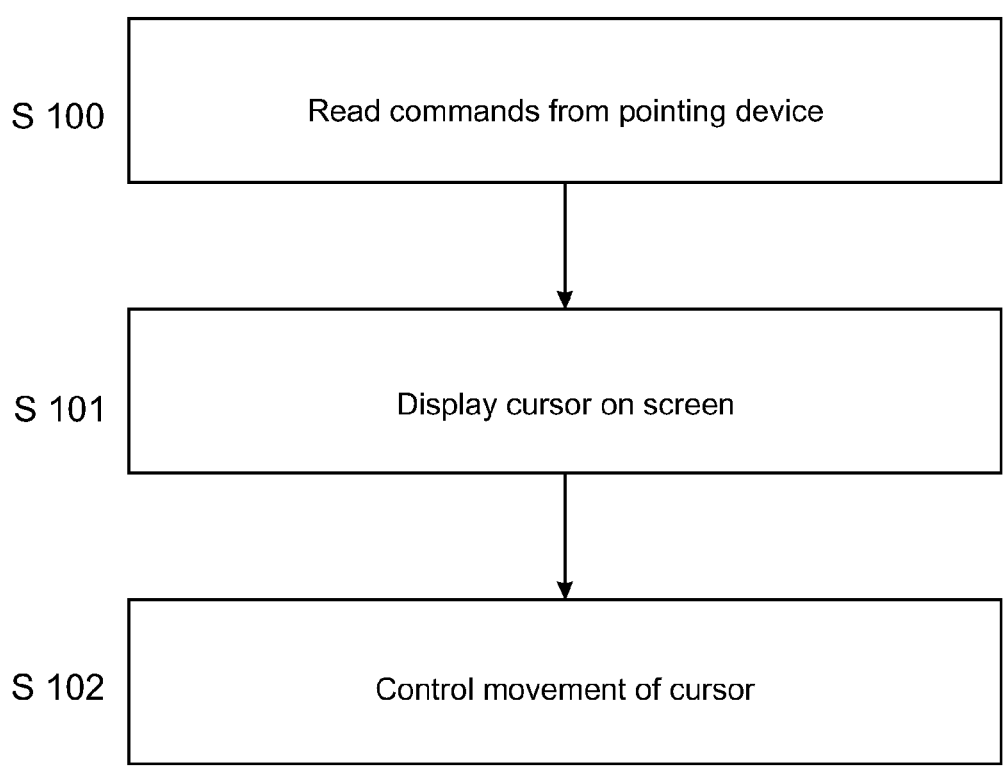
FIG. 2 shows a method according to embodiments of the invention.

FIG. 2 shows a method according to embodiments of the invention. In operation, in step S100 commands from the pointing device 20 are read in by the control device 18. This means, a user can move the pointing device 20 according to the desired movement of the cursor 16 on the screen 12, in order to enter the respective commands for moving the cursor 16. The control device 18 is also provided for displaying the cursor 16 on the screen 12, as illustrated by step S101. The control device 18 translates the commands from the pointing device 20 according to a transfer function into control signals for moving the cursor 16 displayed on the screen 12, accordingly. As shown in step S102, the control device 18 controls and provides the signals to the screen 12 on which the movement and new position of the cursor 16 is displayed.

When a positioning button 22 provided at the pointing device 20 is pressed, the cursor 16 is positioned at a predefined position on the screen 12, wherein the preferred predefined position is the center of the screen 12. The predefined position can also be one of the corners of the screen 12, or any other predefined position on the screen 12. This way, the cursor 16 can be recalibrated.

According to a first embodiment, the transfer function is defined such that when the cursor 16 hits the edge of the screen 12 and the pointing device 20 is moved further beyond this point in a direction which cannot be followed by the cursor 16 due to reaching the edge of the screen 12, the movement of the pointing device 20 is remembered and the cursor 16 starts moving away from the edge again, when the pointing device 20 is moved back by the same distance as it was moved beyond the time point when the cursor 16 had hit the edge of the screen 12.

Figure 3:
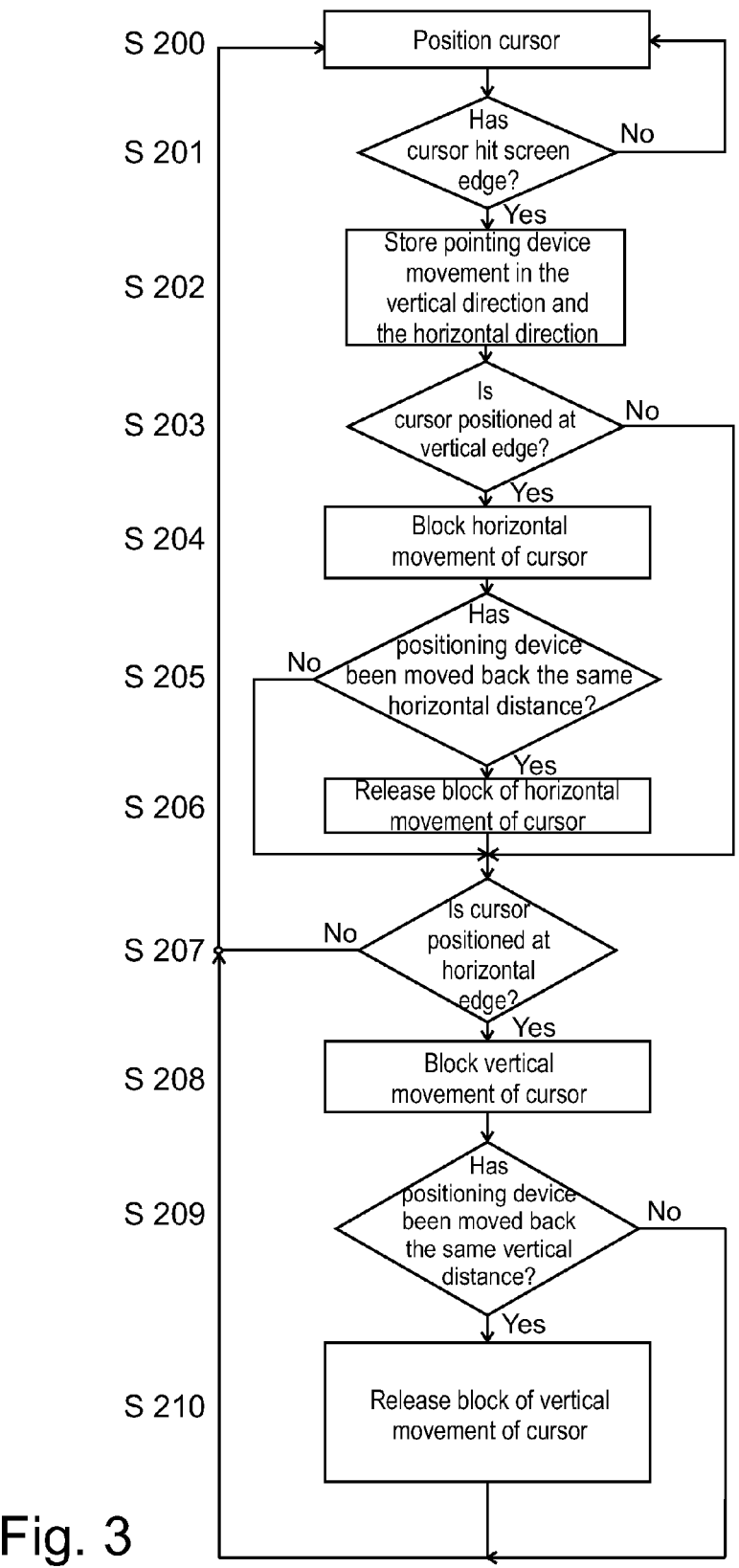
FIG. 3 illustrates a transfer function according to a first embodiment.

This transfer function according to the first embodiment is described in detail with reference to FIG. 3. In step S200 of the routine of this transfer function, the cursor 16 is positioned according to the commands supplied by the pointing device 12. In this cursor positioning the latter described blockings of any direction is considered. In the following step S201 it is determined, if the cursor 16 already hit an edge of the screen 12. If this is not the case, the routine returns to step S200. If the cursor 16 is already positioned at an edge of the screen 12, the routine proceeds to step S202, where the movement after the cursor 16 hit the screen 12 is stored. In this storing step, the movement in the vertical direction is stored separated from the movement in the horizontal direction. In step S203 it is determined, if the cursor 16 is positioned at a vertical edge (left or right edge of screen). If not, the routine proceeds to step S207. If it is the case, the movement of the cursor 16 in the horizontal direction (direction from left to right or vice versa) is blocked in step S204. This way the cursor 16 stays at the respective edge. If for example the cursor is at the left edge of the screen 12 and the pointing device 20 is moved further to the left, the cursor 16 stays at the left edge. However, if the pointing device 20 is moved further to the left and upwards, the cursor 16 stays at the left edge of the screen, but can follow the upwards movement of the pointing device 20 (if this direction is not kept blocked by S208, too). Then, in step S205 it is determined, if the positioning device 20 was moved back the same horizontal distance (distance along the horizontal direction) since the cursor 16 hit the vertical edge. If not, the horizontal movement of the cursor 16 is kept blocked and the routine continues to step S207. If the result in S205 is positive, the blocking of the cursor movement in the horizontal direction is released and the routine continues to step S207. This also includes the situation where the cursor 16 has moved more than the same distance back, wherein in this case the difference between the distance to the edge and the device displacement should be used to position the cursor 16 on the screen 12. At S207 it is determined if the cursor 16 is positioned at the horizontal edge of the screen (upper or lower edge). If not, then the routine returns to step S200. If it is the case, the movement of the cursor 16 in the vertical direction (up and down direction) is blocked in step S208. This way the cursor 16 stays at the respective edge. Please note, that in case of S203 or S207 being positive, the cursor 16 is located at the vertical or horizontal edge of the screen. For the case that S203 and S207 are positive, the cursor 16 is located in one of the corners of the screen. Step S208 is followed by step S209, where it is determined if the positioning device 20 was moved back the same vertical distance (distance along up and down direction) since the cursor 16 hit the horizontal edge. If not, the vertical movement of the cursor 16 is kept blocked and the routine returns to step S200. If the result in S205 is positive, the blocking of the cursor movement in the vertical direction is released and the routine also returns to step S200. Here it is noted again that this step also includes that the situation where the cursor 16 has moved more than the same distance back, wherein in this case the difference between the distance to the edge and the device displacement should be used to position the cursor 16 on the screen 12.

According to a second embodiment, the transfer function is variable according to previous movements of the pointing device, which were made within a previous time frame, such that small movements within the previous time frame lead to the ratio of pointing device movement to the cursor movement being greater than in the case of large movements within the previous time frame.

Figure 4:
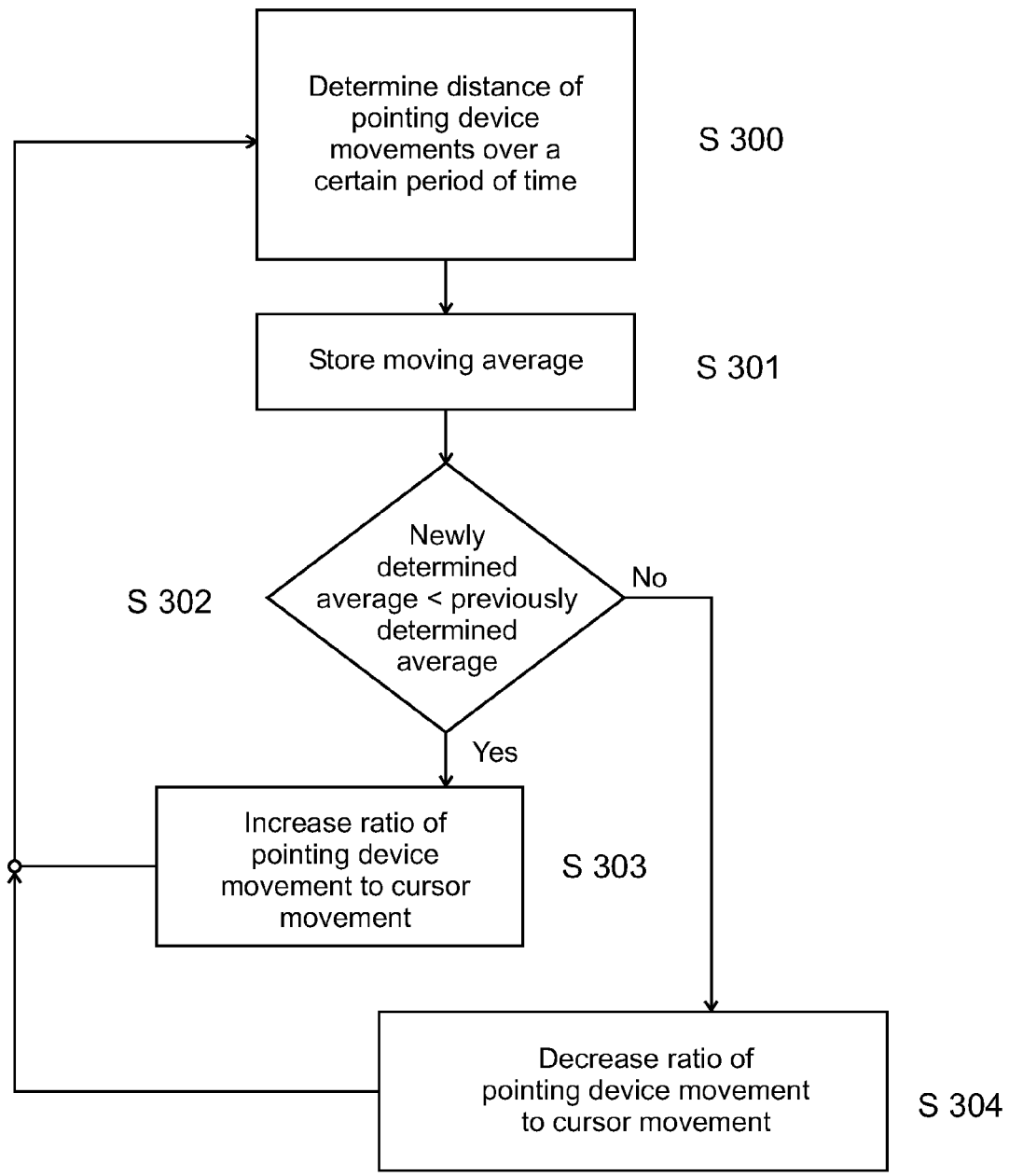
FIG. 4 illustrates a transfer function according to a second embodiment.

This transfer function according to the second embodiment is described in a simplified manner with reference to FIG. 4. In step S300 the distance of the pointing device movements is measured over a certain period of time (for example 1 to 10 seconds). It is noted that this step is simplified, in practice the movement is sampled into a continuous stream of positions. This allows for easy calculation of quantities like velocity, moving average of the velocity, etc. In step S300 one movement is considered to be the movement until the direction of the movement substantially changes (greater than 20° to 30°) or reverses. From this plurality of movements a moving average of the moving distance is calculated. Instead of the moving average, also some other kind of quantity calculated from past movements can be used. In step S301, the calculated moving average is saved into a memory of the control device 18. Thereafter, in step S302, the newly calculated moving average is compared with a previously calculated moving average. If the newly calculated or determined moving average is smaller than the previously determined moving average, the routine proceeds to step S303 where the ratio of pointing device movement to cursor movement is increased. Otherwise, the routine proceeds to step S304, where the routine decreases the ratio of pointing device movement to cursor movement. After steps S303 and S304, the routine returns to step S300.

Additionally, the transfer function according to the second embodiment can provide the feature that the ratio of pointing device movement to cursor movement is not changed until the newly determined moving average and the previously determined moving average deviate by a certain amount from each other. Further, it can comprise the feature that the magnitude by which the ratio is increased or decreased depends on the magnitude of deviation between the newly determined moving average and the previously determined moving average. Moreover, prior to step S304 (and after S302), an additional step can be inserted, to insure that in case of the newly determined moving average being equal to the previously determined moving average (which is unlikely), step S304 is skipped.

Moreover, the invention can be further developed advantageously by making the transfer function variable according to the velocity of the pointing device movement such that a low pointing device movement velocity leads to the ratio of pointing device movement to the cursor movement being greater than in the case of a high pointing device movement velocity. Thus, moving the pointing device slowly requires large but slow movements, which makes exact positioning of the cursor 16 easier.

With respect to the above transfer functions it is emphasized that the first and second embodiment can also be combined in order to provide an overall improved operability of the cursor.

The invention can be implemented in any device that translates relative motion of the pointing device 20 into motion of the cursor 16. The translation from device motion to cursor motion (usually performed in the control device 18 by a device driver) has to be implemented such that when the cursor 16 hits the edge of the screen 12, the device motion in horizontal and vertical direction is stored and integrated. Only when the integrated motion is zero (the device is at the orientation where the cursor just hit the edge of the screen) the device motion is translated into cursor motion again. This is done in horizontal and vertical direction separately.

The transfer functions define the motion of the pointing device 20 and the motion of the cursor 16, wherein these transfer functions can be dependent on the velocity of the pointing device 20 and previous displacements of the pointing device 20 in a limited time interval.

The invention can be applied in any case where a cursor has to be controlled on a large screen with a hand-held device. In particular, this is the case in medical intervention in a catheterization laboratory with a large screen where the physician wants to be able to handle on-screen applications in the examination room. This entails the combination of large cursor distance with precise motions to control application parameters.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously. Any reference signs in the claims should not be construed as limiting the scope of the invention.

The invention claimed is:

1. A system for moving a cursor, the system comprising:
    a pointing device for entering commands in form of a pointing device movement being the movement of the pointing device as a whole or part of it;
    a screen on which the cursor is displayable; and
    a control device being connected with the pointing device and the screen, and being configured for controlling the movement of the cursor within edges of the screen in response to the pointing device movement according to a certain transfer function,
    wherein the transfer function is such that when the cursor hits the edge of the screen and the pointing device movement continues further beyond this point in a direction which cannot be followed by the cursor due to reaching the edge of the screen, the pointing device movement is remembered and the cursor starts moving away from the edge again, when the pointing device as a whole or part of it is moved back by the same distance as it was moved beyond the time point when the cursor had hit the edge of the screen.

2. The system according to claim 1, wherein the pointing device comprises a positioning button for positioning the cursor at a predefined position on the screen.

3. The system according to claim 1, wherein the transfer function is variable according to the pointing device movement velocity.

4. The system according to claim 3, wherein the transfer function is such that a low pointing device movement velocity leads to the ratio of pointing device movement to the cursor movement being greater than in the case of a high pointing device movement velocity.

5. The system according to claim 1, wherein the transfer function is also variable according to previous pointing device movements, which were made within a previous time frame, such that small movements within the previous time frame lead to the ratio of pointing device movement to the cursor movement being greater than in the case of large movements within the previous time frame.

6. A medical device comprising the system according to claim 1.

7. A system for moving a cursor, the system comprising:
    a pointing device for entering commands in form of a pointing device movement being the movement of the pointing device as a whole or part of it;
    a screen on which the cursor is displayable; and
    a control device being connected with the pointing device and the Screen, and being configured for controlling the movement of the cursor within edges of the screen in response to the pointing device movement according to a certain transfer function,
    wherein the transfer function is variable according to previous pointing device movements, which were made within a previous time frame, such that small movements within the previous time frame lead to the ratio of pointing device movement to the cursor movement being greater than in the case of large movements within the previous time frame.

8. The system of claim 7, said pointing device being configured for said movement occurring at a location remote from said screen.

9. A method for moving a cursor, the method comprising the steps of:
    reading commands in form of a pointing device movement being the movement of a pointing device as a whole or part of it;
    displaying the cursor on a screen; and
    controlling the movement of the cursor within edges of the screen in response to the pointing device movement according to a certain transfer function,
    wherein the transfer function is such that the pointing device movement is assigned to a corresponding movement of the cursor on the screen, and
    wherein the transfer function is such that when the cursor hits the edge of the screen and the pointing device movement continues further beyond this point in a direction which cannot be followed by the cursor due to reaching the edge of the screen, the pointing device movement is remembered and the cursor starts moving away from the edge again, when the pointing device as a whole or part of it is moved back by the same distance as it was moved beyond the time point when the cursor had hit the edge of the screen.

10. The method according to claim 9, further comprising the step of positioning the cursor at a predefined position on the screen upon a positioning button at the pointing device being pressed.

11. The method according to claim 9, wherein the transfer function is variable according to the pointing device movement velocity.

12. The method according to claim 11, wherein the transfer function is such that a low pointing device movement velocity leads to the ratio of pointing device movement to the cursor movement being greater than in the case of a high pointing device velocity.

13. The method according to claim 9, wherein the transfer function is also variable according to previous pointing device movements, which were made within a previous time frame, such that small movements within the previous time frame lead to the ratio of pointing device movement to the cursor movement being greater than in the case of large movements within the previous time frame.

14. A method for moving a cursor, the method comprising the steps of:
- reading commands in form of a pointing device movement being the movement of a pointing device as a whole or part of it;
- displaying the cursor on a screen; and
- controlling the movement of the cursor within edges of the screen in response to the pointing device movement according to a certain transfer function,
- wherein the transfer function is variable according to previous pointing device movements, which were made within a previous time frame, such that small movements within the previous time frame lead to the ratio of pointing device movement to the cursor movement being greater than in the case of large movements within the previous time frame.

15. The method of claim 14, said pointing device being configured for said movement occurring at a location remote from said screen.

16. A non-transitory computer readable medium embodying a program for moving a cursor, said program having instructions executable by a processor for performing a plurality of acts, among said plurality there being the acts of:
- reading commands in form of a pointing device movement being the movement of a pointing device as a whole or part of it;
- displaying the cursor on a screen; and
- controlling the movement of the cursor within edges of the screen in response to the pointing device movement according to a certain transfer function,
- wherein the transfer function is such that when the cursor hits the edge of the screen and the pointing device movement continues further beyond this point in a direction which cannot be followed by the cursor due to reaching the edge of the screen, the pointing device movement is remembered and the cursor starts moving away from the edge again, when the pointing device as a whole or part of it is moved back by the same distance as it was moved beyond the time point when the cursor had hit the edge of the screen.

* * * * *